US006466830B1

(12) United States Patent
Manross et al.

(10) Patent No.: US 6,466,830 B1
(45) Date of Patent: Oct. 15, 2002

(54) APPARATUS AND METHOD FOR PRODUCING ELECTRONIC MESSAGES IN A VENDING TERMINAL

(76) Inventors: Karen Manross, 4605 Summit Rd., Pataskala, OH (US) 43062; Jeffrey Manross, 4605 Summit Rd., Pataskala, OH (US) 43062

( * ) Notice: Subject to any disclaimer, the term of this patent is extended or adjusted under 35 U.S.C. 154(b) by 0 days.

(21) Appl. No.: 09/436,033

(22) Filed: Nov. 8, 1999

(51) Int. Cl.[7] .......... G05B 15/00

(52) U.S. Cl. .......... 700/83; 700/17; 700/231; 700/233; 700/232; 700/235; 700/241; 221/9; 221/10; 221/11; 221/14

(58) Field of Search .......... 700/17, 83, 231–238, 700/241–242; 221/9–14; 222/52–69; 271/3.01–3.13; 705/16–25

(56) References Cited

U.S. PATENT DOCUMENTS

| | | | | | |
|---|---|---|---|---|---|
| 3,864,708 A | | 2/1975 | Allen | 700/233 |
| 5,343,386 A | | 8/1994 | Barber | 700/233 |
| 5,426,594 A | | 6/1995 | Wright et al. | 700/233 |
| 5,513,116 A | | 4/1996 | Buckley et al. | 700/233 |
| 5,561,604 A | * | 10/1996 | Buckley et al. | 333/28 R |
| 5,563,805 A | * | 10/1996 | Arbuckle et al. | 345/708 |
| 5,617,528 A | * | 4/1997 | Stechmann et al. | 358/540 |
| 5,623,581 A | | 4/1997 | Attenberg | 700/83 |
| 5,898,434 A | * | 4/1999 | Small et al. | 345/810 |
| 6,255,942 B1 | * | 7/2001 | Knudsen | 340/506 |
| 6,353,848 B1 | * | 3/2002 | Morris | 709/200 |

* cited by examiner

*Primary Examiner*—Ramesh Patel
(74) *Attorney, Agent, or Firm*—Harpman & Harpman

(57) ABSTRACT

An interactive internet photo terminal for composing an electronic self-image photo message utilizing a “live” image background of the terminal’s location. The photo terminal includes a cash and credit receiving device, video camera and message composition input control monitor interconnected to a CPU and telecommunication connector capability.

4 Claims, 3 Drawing Sheets

APPARATUS AND METHOD FOR PRODUCING ELECTRONIC MESSAGES IN A VENDING TERMINAL

BACKGROUND OF THE INVENTION

1. Technical Field

This invention relates to electronic photo imaging and transmission devices that electronically capture and convert live images for processing and transmitting over telecommunication conduits.

2. Description of Prior Art

Prior art devices of this type are directed to photo booths and electronic imaging stations wherein an individual typically enters a small enclosure with a fixed instance photographic camera, takes and processes a number of still photos for a prescribed fee. Electronic "photo" booths or sticker stations use a video camera and printing device to capture the user's image on a tangible form with pre-selected fixed or electronic backgrounds, see for example U.S. Pat. Nos. 3,864,708, 5,426,594, 5,343,386, 5,513,116 and 5,623,581.

In U.S. Pat. No. 3,864,708 an automatic photographic apparatus is disclosed having a booth with a background scene that produces photo postcards of the individual.

U.S. Pat. No. 5,426,594 is directed to an electronic greeting card store and communication system where an electronic greeting card is composed by the user from a catalog of pre-determined images with custom texts and transmitted electronically by the sender to the intended receiver by telecommunication means.

U.S. Pat. No. 5,343,386 claims an apparatus for making an electronically produced postcards wherein a user generates a self-portrait in a pictorial background by use of a video camera and electronic processing equipment. The stored image is then printed out on a postcard format for immediate use.

U.S. Pat. No. 5,513,116 discloses a vending machine for personal and customized products including greeting cards and the like.

In U.S. Pat. No. 5,623,581 a direct view interactive photo kiosk that composes live images and superimposes them on an electronic generated background is disclosed. A hard copy of the composed image is then printed out for the user.

SUMMARY OF THE INVENTION

The present invention provides for a self-contained photographic apparatus for the composition of a custom electronic photo image of the user in a scenic background location where the invention is placed. The image of the user in the background is processed into an electronic message format and is transmitted via telecommunication equipment to multiple recipients at remote locations for a prescribed fee. Customized software allows for personalized text message input and controls payment options via consumer currency or debit venues. A number of pre-programmed electronic internet service providers and messages are available in one touch activated screen formats for customizing the electronic message.

DESCRIPTION OF THE PREFERRED EMBODIMENT

Figure 1:
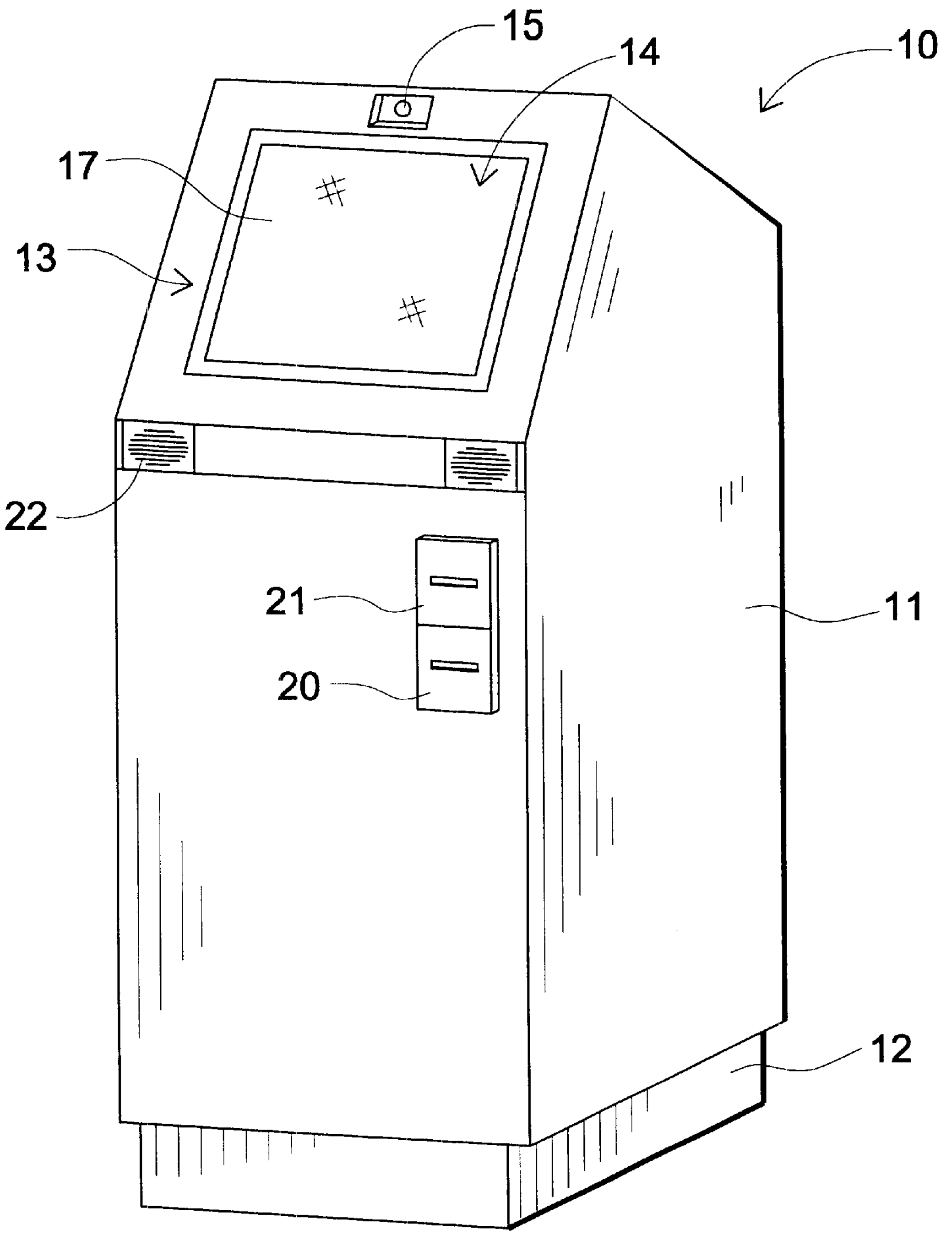
FIG. 1 is a perspective view of the preferred embodiment of the invention.
Figure 2:
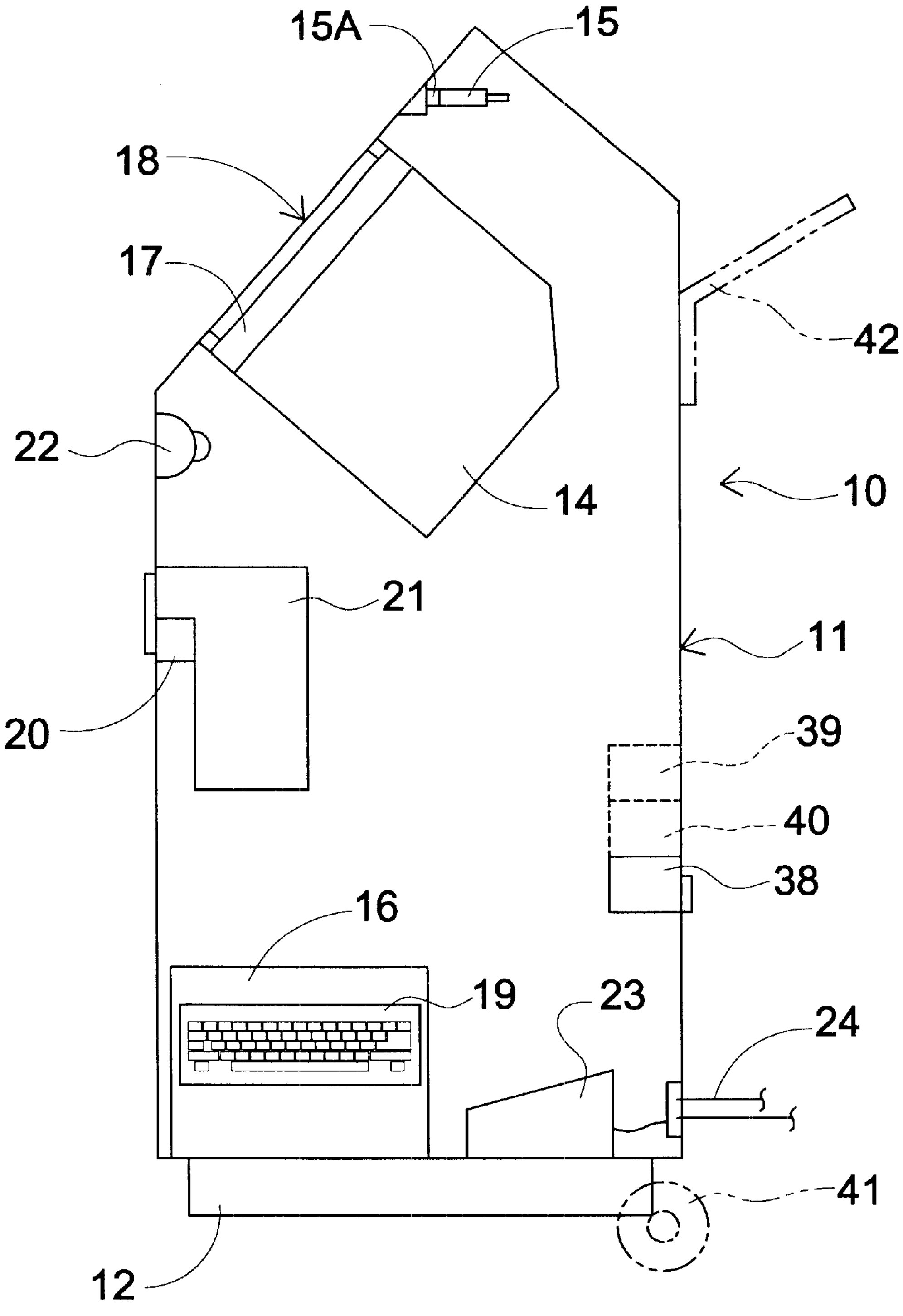
FIG. 2 is a graphic illustrative view of the invention and its related interior components.

Referring to FIGS. 1 and 2 of the drawings, an electronic message vending apparatus 10 of the invention can be seen having an enclosure 11 with a support base 12 with an access surface area 13. The enclosure has a video monitor 14 and camera 15 interconnected to a central processing unit (CPU) 16. The camera 15 is of a digital type for producing full color images. The camera 15 has a lens 15A of the type having a focal length capable of capturing the user in a live background environment. A video touch screen input device 17 is incorporated with the video monitor 14. The touch screen device 17 includes a glass overlay to measure the dampening effect of a user's finger on high frequency acoustical waves transmitted through the surface of the glass overlay defining a user input access portal at 18 as will be well understood by those skilled in the art. An internal keypad 19 allows service personnel input for maintenance and special input by the provider to the system.

A credit card reader and processor 20 and currency input device 21 provides for message vending apparatus 10 activation after initial customer contact input. Speakers 22 in the enclosure are interconnected to the CPU 16 for audio output of instructions and announcements to the user. A battery powered back-up device 23 is interconnected to the hereinbefore described components and a source of electrical power generally illustrated at 24 is illustrated.

The credit card reader and processor 20 has customized software to validate major credit and debit cards represented by expiration date. The currency input device 21 is capable of accepting currency and voucher inserted in any direction storing same and is connected to the central processing unit 16 by components well known to those skilled in the art and available commercially.

Figure 3:
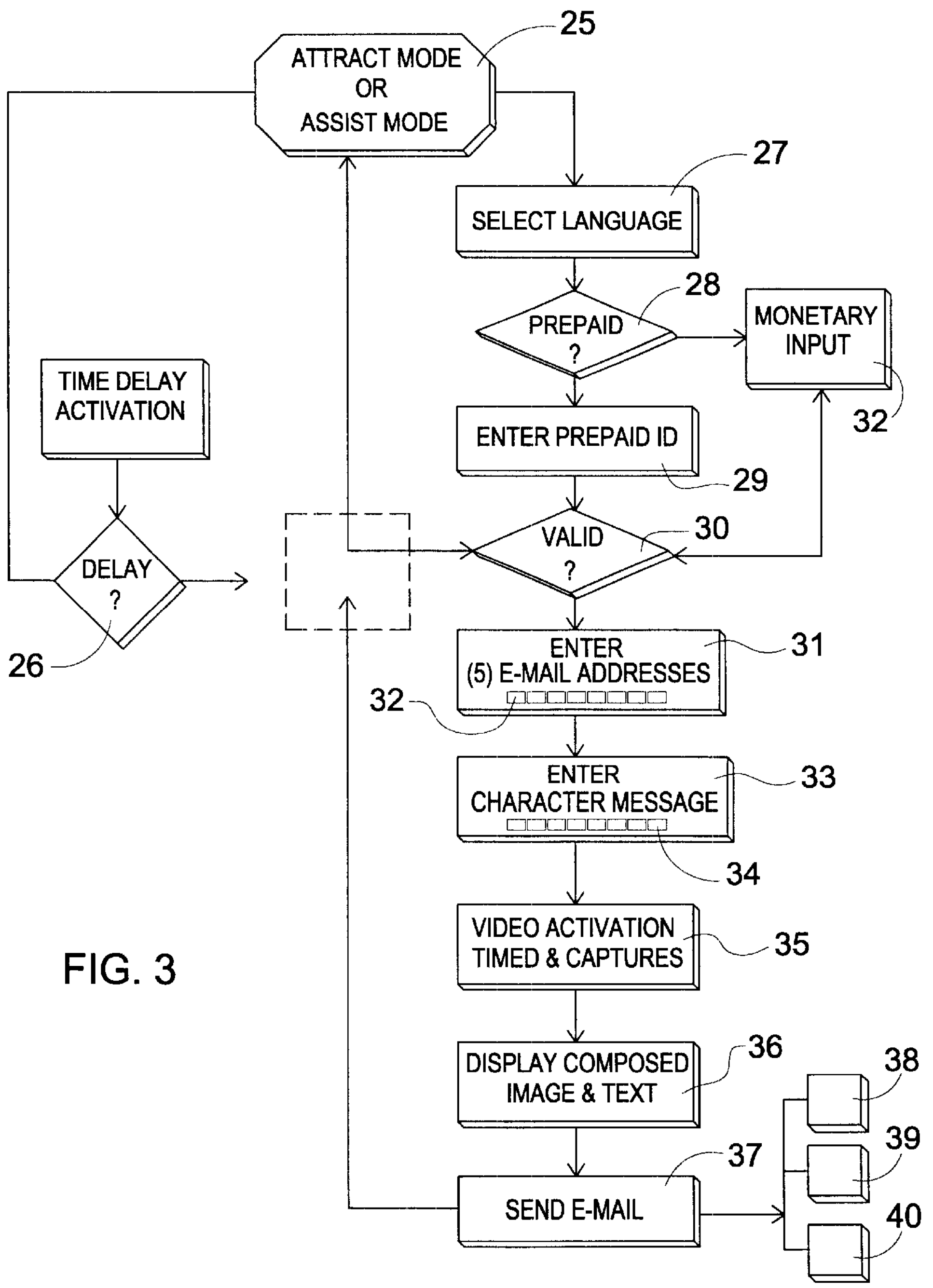
FIG. 3 is a block flow diagram of the method steps of the invention.

Referring now to FIG. 3 of the drawings, a block flow diagram can be seen outlining user access and process steps taken in view thereof by the message vending apparatus 10 of the invention.

The initial pre-program mode is defined as "active or assist" at 25. The user is invited at this initial step to use the message vending apparatus 10 by initially touching the touch activated monitor screen 17 as hereinbefore described. The user then has options for additional decision time at 26 and if chosen it then provides the user with additional preset time of 15 seconds in this example chosen for illustration. In the next step a multiple language selection screen 27 is displayed wherein the user can select from a list of languages by which the remaining instructions and choices will be displayed. After the language selection at 27 a first payment screen 28 is displayed asking if the user is prepaid. If the answer is affirmative, the user is then asked to enter a pre-payment ID at the prepay ID screen 29. The user will be allowed three attempts to enter a valid pre-payment ID which will be validated at 30 before the sequence proceeds to and enter E-mail address screen at 31.

If the answer is no to the pre-paid payment screen 28 then the user will be provided with a menetary input selection screen 32 which will also be displayed if the prepaid ID ending sequence is determined not valid at 30.

The monitor input screen 32 will accept payments in the form of local currency via the currency input processor device 21 and by the credit card reader and processor 20 as illustrated in FIG. 2 of the drawings. Payment vouchers having been issued exclusively for the message vending apparatus 10 of the invention can also be chosen for presentation at this screen.

After validation of payment input, the E-mail address input screen 31 appears for the user to enter up to five E-mail recipients. Quick keys 32 are displayed on the input screen 31 for the top ten E-mail ISP (internet service providers) to speed ease of E-mail address entry by the user. After completion of the "address" step the user is displayed a message enter screen 33 in which the user can enter up to 200 characters of a personalized message or use quick key message input representations at 34 displayed that will insert pre-programmed phrases such as "Wish you were here", "Having a great time", "See you soon" typical of electronic message phraseologies. After completion of the message input and any corrections the video camera 15 will be activated and displayed on a timed actuation composer screen 35 freezing the last frame after five seconds in this example. Alternate video frame time delay can be pre-programmed by video control capture software. This time delay will give the user time to frame him or herself in the live background to their satisfaction.

The last video frame will be displayed as notes with the completed message and inputted E-mail addresses on a display screen 36. After final confirmation and acceptance of the displayed screen 36, message contents is sent via a modem 38 as illustrated in FIG. 2 of the drawings. Alternately, the message is sent by a land port 39 interconnected to a communications network, or by a wireless transmission indicated at 40 to the selected and displayed E-mail addresses chosen by the user as hereinbefore described.

Referring back to FIG. 2 of the drawings, a pair of wheels 41 and handle 42 shown in broken lines will allow for mobile use of the message vending apparatus of the invention.

It will thus be seen that a new and novel message vending apparatus has been illustrated and described and it will be apparent to those skilled in the art that various changes and modifications may be made therein without departing from the spirit of the invention.

We claim:

1. An electronic message vending and transmission device for creating personal electronic images in a scenic live background with messages comprises, an electronic graphics input portal for selective user input and display of composed image message, a computer connected to said input portal with custom programming software controlling a pre-determined set of operational instructions, a digital camera positioned to capture an user's image in the scenic live environment interconnected to said computer by electronic means, operational validation input means comprising, a credit debit card reader and currency deposit receiver and telecommunication means linking the computer to selected receivers via an internet highway to deliver composed electronic images in the form of integral screen displays.

2. The electronic message vending and transmission device set forth in claim 1 wherein said electronic graphic input portal comprises a video monitor and a touch screen input insert device thereon.

3. The electronic message vending and transmission device set forth in claim 1 wherein said operational validation input means further comprises, software means under control of said electronic graphic input portal to download selected portal input data and confirmation data from said credit debit card reader and currency deposit receiver.

4. The electronic message vending and transmission device set forth in claim 1 wherein said telecommunication means may include one of the following group including modem, land portal and wireless transmission devices.

* * * * *